Dec. 20, 1932.   W. W. SHANOR   1,891,288
SCRAPER
Filed Aug. 20, 1931   3 Sheets-Sheet 1
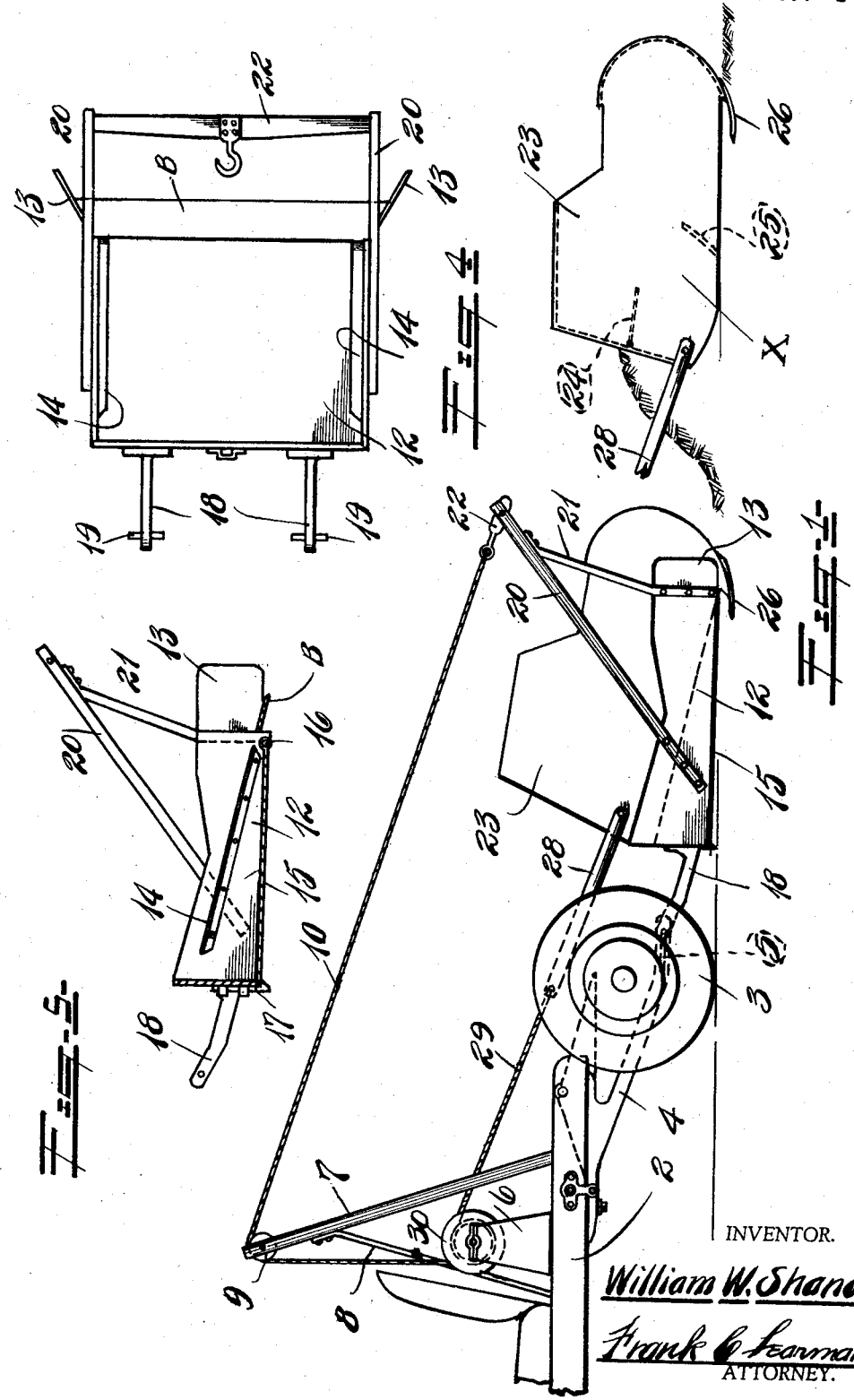
INVENTOR.
William W. Shanor.
Frank C. Fearman.
ATTORNEY.

Dec. 20, 1932.  W. W. SHANOR  1,891,288
SCRAPER
Filed Aug. 20, 1931  3 Sheets-Sheet 2
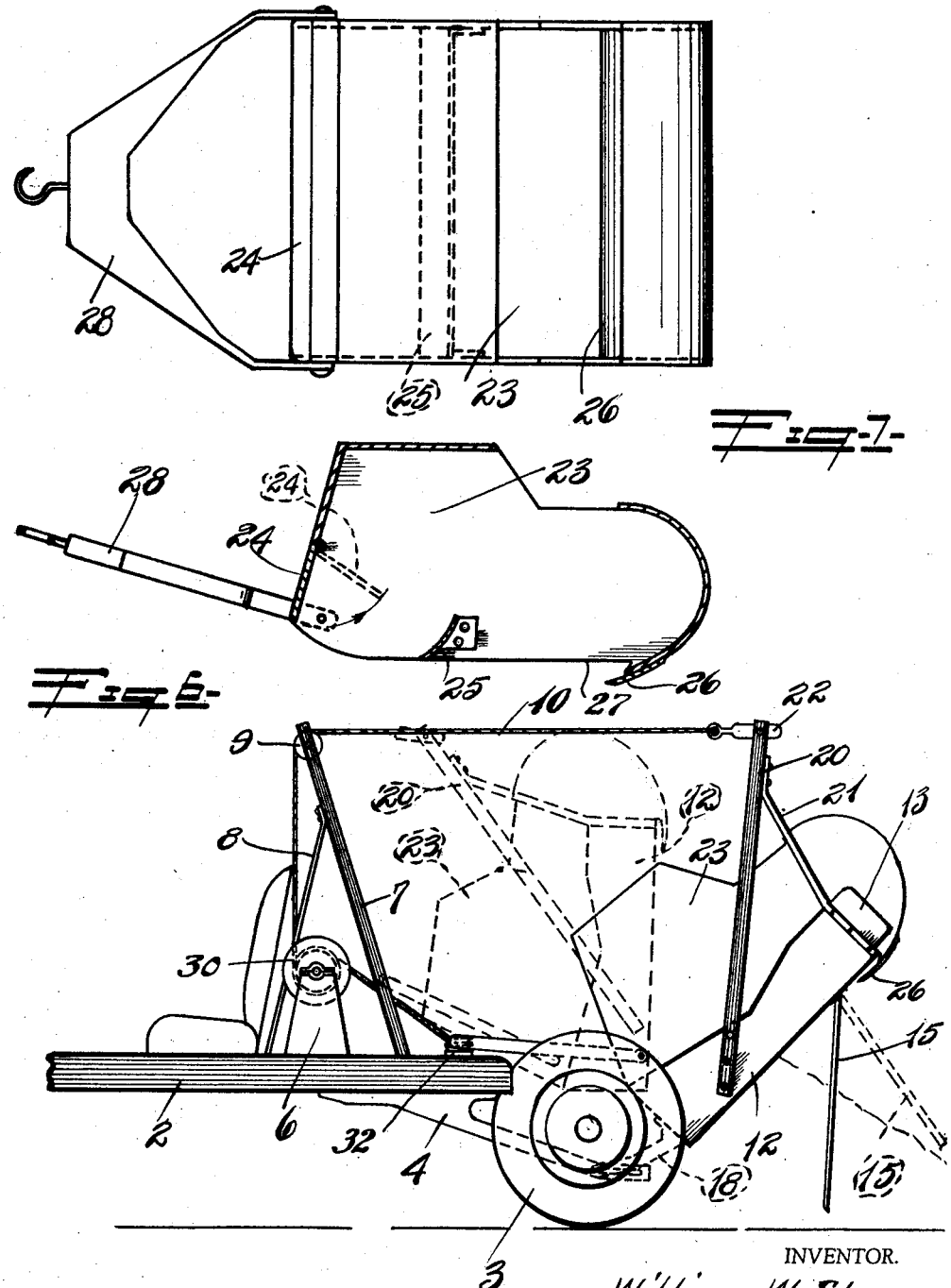
INVENTOR.
William W. Shanor
BY Frank C. Learman.
ATTORNEY.

Dec. 20, 1932.  W. W. SHANOR  1,891,288
SCRAPER
Filed Aug. 20, 1931   3 Sheets-Sheet 3
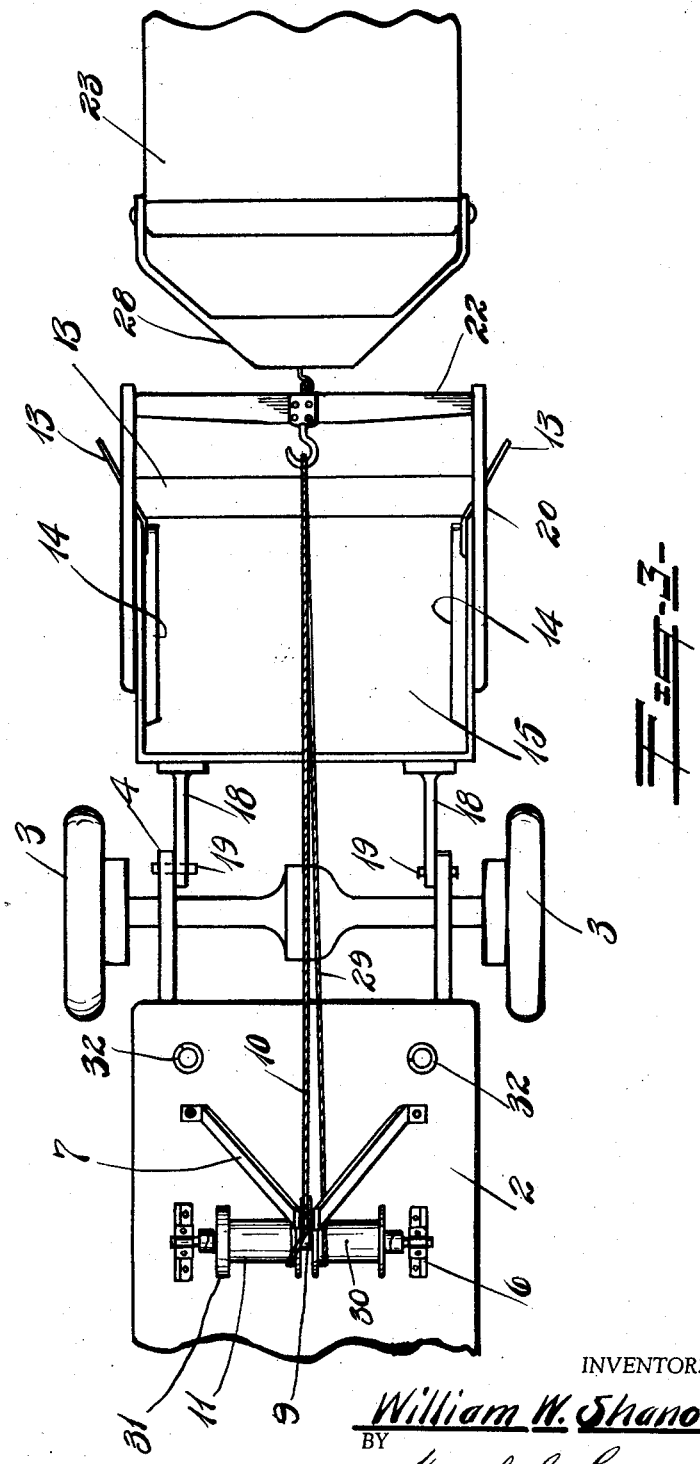
INVENTOR.
William W. Shanor.
BY
Frank C. Earman.
ATTORNEY.

Patented Dec. 20, 1932

1,891,288

UNITED STATES PATENT OFFICE

WILLIAM W. SHANOR, OF SAGINAW, MICHIGAN

SCRAPER

Application filed August 20, 1931. Serial No. 558,277.

This invention relates to scrapers and more particularly to a mechanically operated truck scraper which permits a truck driver to load, haul, and unload without the assistance of a helper or loss of time.

Another object of the invention is to design a truck scraper of simple, practical and substantial construction, and provide means for progressively loading the scraper, elevating it onto a skip, and then swinging said skip and scraper onto the truck, and in such position that it can be readily transported any desired or required distance for dumping.

A further object is to provide a simple, and substantial skip hingedly connected to the truck, and onto which the scraper is drawn when the scraper is loaded.

A further object still is to provide means actuated by the power plant of the truck for drawing the scraper into the material to be loaded, as well as elevating the loaded scraper and holding it in elevated position.

A further object still is to provide means for holding and guiding the scraper into the material during the loading operation.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction without departing from the spirit, or sacrificing any of the advantages of the invention.

In the drawings.

Fig. 1 is a fragmentary side elevation of my scraper truck, the scraper being shown in two positions, position "X" showing the scraper being loaded, the other position showing it on the skip and ready to be elevated onto the truck.

Fig. 2 is also a fragmentary side elevation, the dotted lines showing the skip and scraper in position for transporting to the dumping place, the full line position showing the scraper being dumped.

Fig. 3 is a top plan view of the device.
Fig. 4 is a detail top plan view of the skip.

Fig. 5 is a longitudinal sectional view thereof.

Fig. 6 is a longitudinal sectional view of the scraper.

Fig. 7 is a top plan view thereof.

Referring now more particularly to the drawings, the numeral 2 indicates the frame of a conventional motor truck such as used in construction work on highways in general, this frame being supported on ground engaging wheels 3 as usual, and skip supports 4 are rigidly bolted to the frame members as shown, the ends of said supports projecting rearwardly and being slotted as shown at 5, and for a purpose to be presently described.

A winch assembly 6 is mounted on the frame 2 and is actuated from the truck power plant through instrumentality of a power take-off, (not shown), and I do not deem it necessary to show or describe this winch assembly in detail as it requires but two drums and a brake and can be of the conventional design generally used for this purpose, and while I have shown it as mounted on the truck in the rear of the driver's seat, it will be obvious that it can be mounted on the front end of the frame or in any other desired position.

A mast or A frame 7 is mounted on the vehicle frame, and braces 8 serve to secure it in proper position, a sheave 9 being journaled on the upper end of the mast, and accommodates a cable 10 which leads to and is wound on the winch drum 11.

A skip 12 is secured to the supports 4 and is formed as clearly shown in Figs. 4 and 5 of the drawings, being preferably constructed of sheet metal, and having front and side walls, the rear ends 13 of said side walls being flared outwardly as shown, and for the purpose of guiding the scraper as it is drawn onto the skip, an inclined plate "B" is provided as shown and serves as an anchor to prevent backward movement of the truck, this plate being forced into the earth as the scraper is being loaded.

Inclined track members 14 are rigidly secured to the side walls of the skip, and a dump door 15 is hingedly connected to the bottom at the point 16, a suitable latch 17 serving to hold it in closed position. Arms 18 are secured to the front wall of the skip and transversely disposed pins 19 are anchored therein, and are adapted to engage the slotted openings 5 provided in the skip supports, these slotted arm connections providing considerable play so that the skip readily adjusts itself to suit conditions.

Rearwardly inclined members 20 are securely riveted to the side walls of the skip, and braces 21 serve to reinforce said members, a pivoted beam 22 being connected to the upper end of the members 20, and one end of the cable 10 is anchored thereto.

The scraper 23 is formed as clearly shown in Figs. 6 and 7 of the drawings, and is preferably formed of sheet metal, a door 24 being provided in the front end, and a scraper blade 25 is secured therein in position as shown, the space between the door and blade being open.

The rear end of the scraper is rounded and a scraper blade 26 is secured to the bottom thereof, and serves as a guide to hold the scraper into the material during the loading operation, an opening 27 being provided directly ahead of said blade, so that the earth or material may pass into the scraper. A bail 28 is pivotally secured to the side walls, and a cable 29 is anchored thereto, said cable being anchored to and is wound on the winch drum 30 as the drum is rotated.

The operation of the mechanism is as follows: When arriving at the work the driver releases the brake 31, the cable 10 unwinds to permit the scraper and skip to drop down onto the ground, and as the truck moves ahead, the cable 29 "pays out", so that the scraper is positioned in the material to be moved, the drum 30 is then rotated to wind the cable 29, pulling the scraper through the material to be loaded. The door 24 swinging open, and the blade 25 cutting into the material to fill the scraper, the blade 26 holding it steady, the scraper is thus pulled ahead and onto the skip, the flared side walls centering said scraper so that it can be readily pulled up the inclined tracks.

The drum 11 is next actuated to swing and elevate the skip and scraper to position as shown in dotted lines in Fig. 2 of the drawings, the end of the scraper resting on the resilient spring members 32, the winch brake is then "set" as the skip and scraper are in loaded position so that the truck can be driven to the dumping place. Upon reaching the dumping place the drum brake 31 is released, and the cable 10 "pays out" to permit the mechanism to assume the position shown in full lines in Fig. 2, the door 15 is unlatched and the load is dumped.

The various steps and operations are simple and easy, all mechanism is controlled from the driver's seat by the driver, and no helper or extra labor is required to assist.

From the foregoing description it will be obvious that I have perfected a very simple, practical, and economical truck scraper for loading, hauling, and unloading materials of any nature.

What I claim is:—

1. A loading device comprising a vehicle, a skip pivotally connected thereto, a scraper adapted to be mounted on said skip when loaded, and means for swinging said skip and scraper onto the vehicle for transporting to the dumping place.

2. A device as set forth in claim 1 in which the skip is provided with a bottom dump door.

3. A device as set forth in claim 1 in which the swinging means comprises a winch with a cable leading to said skip and scraper.

4. A device as set forth in claim 1 in which the scraper is provided with a transversely disposed blade for loading material into the scraper as it is drawn forward.

5. A device as set forth in claim 1 in which the skip is provided with inclined tracks onto which the scraper is drawn when loaded.

6. A loading device comprising a vehicle, a winch mounted thereon, a skip pivotally connected to the vehicle frame, a scraper, means for guiding said scraper into the material to be loaded as it is being drawn onto the skip, and a cable connected to said winch for swinging said skip and scraper onto the vehicle as the winch is operated.

7. A loading device comprising a vehicle, skip supports mounted on said vehicle, a skip loosely and pivotally connected thereto and provided with inclined tracks, a scraper adapted to be drawn onto said skip when loaded, and means for swinging said skip and scraper, as a unit, upwardly and onto said vehicle.

8. A loading device comprising a vehicle, a skip pivotally and loosely connected to the vehicle frame, a scraper adapted to be loaded with the material to be moved as the scraper is drawn forwardly and onto the skip, means for swinging said skip and scraper upwardly as a unit, and resilient means engaging the scraper when the unit is swung to loaded position.

9. A loading device comprising a vehicle, a skip pivotally connected to the vehicle frame, a scraper, a guide blade on the rear end of the scraper for guiding and engaging the work as the scraper is being loaded, and means for swinging said skip and scraper upwardly and onto said vehicle.

10. A loading device comprising a vehicle, a skip pivotally connected thereto and provided with spaced apart inclined tracks and a bottom dump door, a scraper, blades on said scraper and adapted to engage the materials to be moved for loading said scraper as it is drawn forward and onto said inclined tracks, means for drawing said scraper, and means for swinging said skip and scraper upwardly and onto the vehicle.

11. A loading device comprising a vehicle, a winch mounted thereon and adapted to be driven from vehicle power plant, a skip pivotally connected to the vehicle frame and having rearwardly flared side walls, a scraper adapted to be loaded with the material to be moved, a gate at the front end of said scraper, means for pulling the scraper forwardly and onto the skip, and a cable connected to the winch and skip respectively for swinging said skip and scraper upwardly and onto the vehicle frame.

12. A loading device comprising a vehicle frame, resilient members mounted thereon, a skip pivotally connected thereto and provided with spaced apart inclined tracks, a scraper, means for guiding said scraper into the work as the scraper is drawn forwardly and onto said tracks, means for drawing the scraper, and means for swinging said skip and scraper upwardly and onto said resilient means after it has been loaded.

13. A loading device comprising a vehicle, skip supports mounted on said vehicle, a skip loosely and pivotally connected thereto and provided with inclined tracks, a downwardly inclined blade on the rear end thereof, a scraper adapted to be drawn onto said skip when loaded, and means for swinging said skip and scraper, as a unit, upwardly and onto said vehicle.

14. A loading device comprising a vehicle, a skip pivotally connected to the vehicle frame, a scraper having a closed front end, a guide blade on the rear end of the scraper for guiding and engaging the work as the scraper is being loaded, and means for swinging said skip and scraper upwardly and onto said vehicle.

15. A loading device comprising a vehicle, a skip pivotally connected to the vehicle frame, a scraper provided with a blade on the bottom thereof, a door in the front end, said door being closed when the scraper is loaded, a guide blade on the rear end of the scraper for guiding and engaging the work as the scraper is being loaded, and means for swinging said skip and scraper upwardly and onto said vehicle.

In testimony whereof I hereunto affix my signature.

WILLIAM W. SHANOR.